Figure 3:
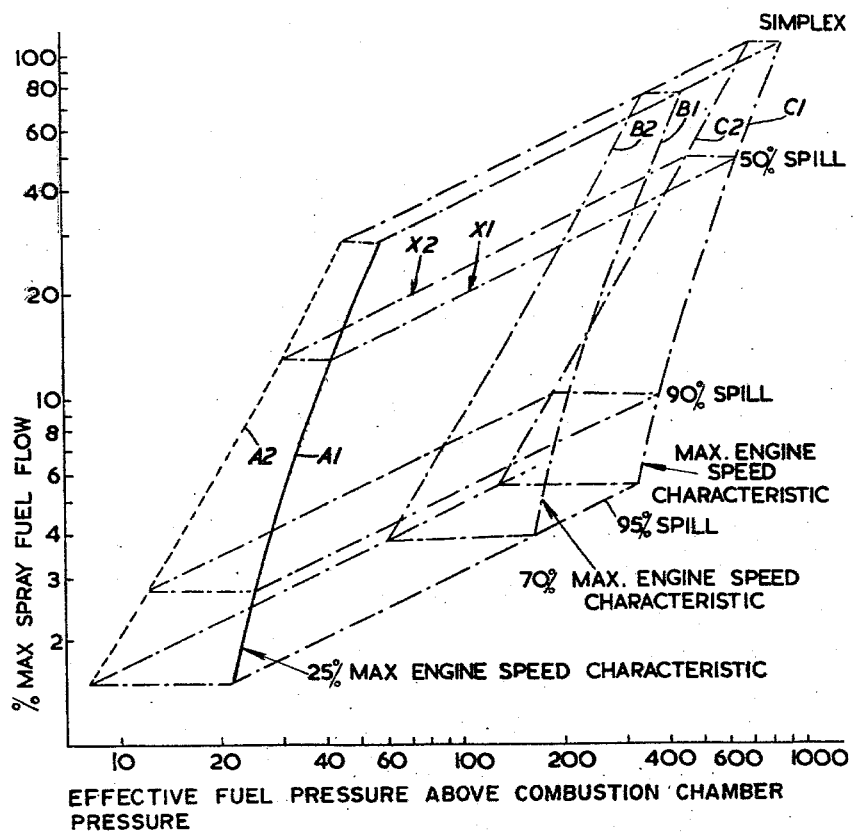

July 20, 1965  S. R. TYLER  3,195,611
FUEL SUPPLY SYSTEMS
Original Filed Sept. 28, 1959  4 Sheets-Sheet 1
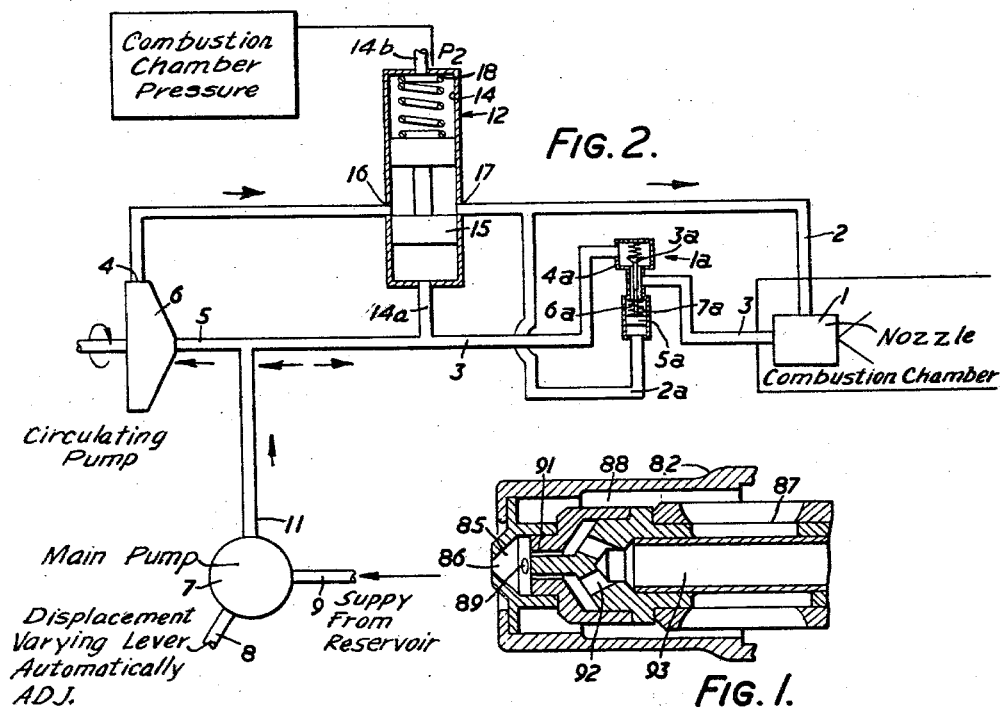
INVENTOR
STANLEY R. TYLER
BY
ATTORNEYS United States Patent Office 3,195,611
Patented July 20, 1965

3,195,611
FUEL SUPPLY SYSTEMS
Stanley R. Tyler, Cheltenham, England, assignor to Dowty Fuel Systems Limited, Cheltenham, England
Continuation of application Ser. No. 842,762, Sept. 28, 1959. This application Sept. 7, 1962, Ser. No. 222,107
4 Claims. (Cl. 158—36.3)

This invention was described in my now-abandoned application Serial No. 842,762, filed September 28, 1959, with a like title and of which this application is a continuation. It relates to liquid supply systems of the kind typified by a fuel supply system for an engine in which fuel is pumped to one or more spray or distributing nozzles, each of which includes a swirl chamber, a fuel supply connection to the chamber to induce swirl motion in fuel supplied to the chamber, a main discharge orifice from the chamber, and a spill connection extending from the chamber.

The main object of the invention is to provide a liquid supply system of the kind referred to in which the maximum supply pump pressures are moderate for high discharge rates. This and other objects are realized, according to the invention, by a liquid supply system of my conception employing one or more nozzles of the earlier described type (hereafter referred to as "spill spray nozzles") and a liquid circulating system for the nozzles including a circulating pump having an inlet and an outlet, and a pair of connections of which one serves as a supply connection between the pump outlet and the nozzles and the other serves as a spill connection between the nozzles and the pump inlet. The circulating system is fed by liquid feed means which are connected with the spill connection and operative to feed liquid into the system over a wide range of flow rates. The feed or delivery rate of the feed means into the circulating system, of course, determines the discharge from the nozzles. Whenever the feed rate into a circulating system such as described, exceeds the delivery of the pump, a condition of flow occurs in which the liquid entering the system in excess of that which the pump will accept, is constrained to move through the spill connection in a direction relatively toward the nozzles. Thus, the nozzles are fed both through the supply connection from the pump and directly through the spill connection from the liquid feed means. This so-called augmented flow condition enables the range of discharge rates from the nozzles to be considerably increased. However, it normally can do so only at the expense of increased pump pressures.

The present invention provides a means for obviating this problem through the technique of lowering the delivery of the pump so that a greater proportion of the liquid flows to the nozzles through the spill connection than could otherwise be the case at reasonable pressures from the feed means. The control means for this purpose may become operative at a feed rate of less than the delivery of the pump and by its operation not only serve to bring the pump delivery down to the feed rate but also to reduce it below the feed rate to adjust the distribution in the supply and spill connections. In the alternative, the control means may not become operative until the delivery of the pump is exceeded by the feed rate, its function in this instance being only one of adjustment of the distribution. Of course, the control means may also be set to become operative at a feed rate equaling the pump delivery. The rate at which it becomes operative is determined in each instance by the point of increased flow in the feed means at which a further increase will generate pressures in excess of those needed for atomization.

Figure 4:
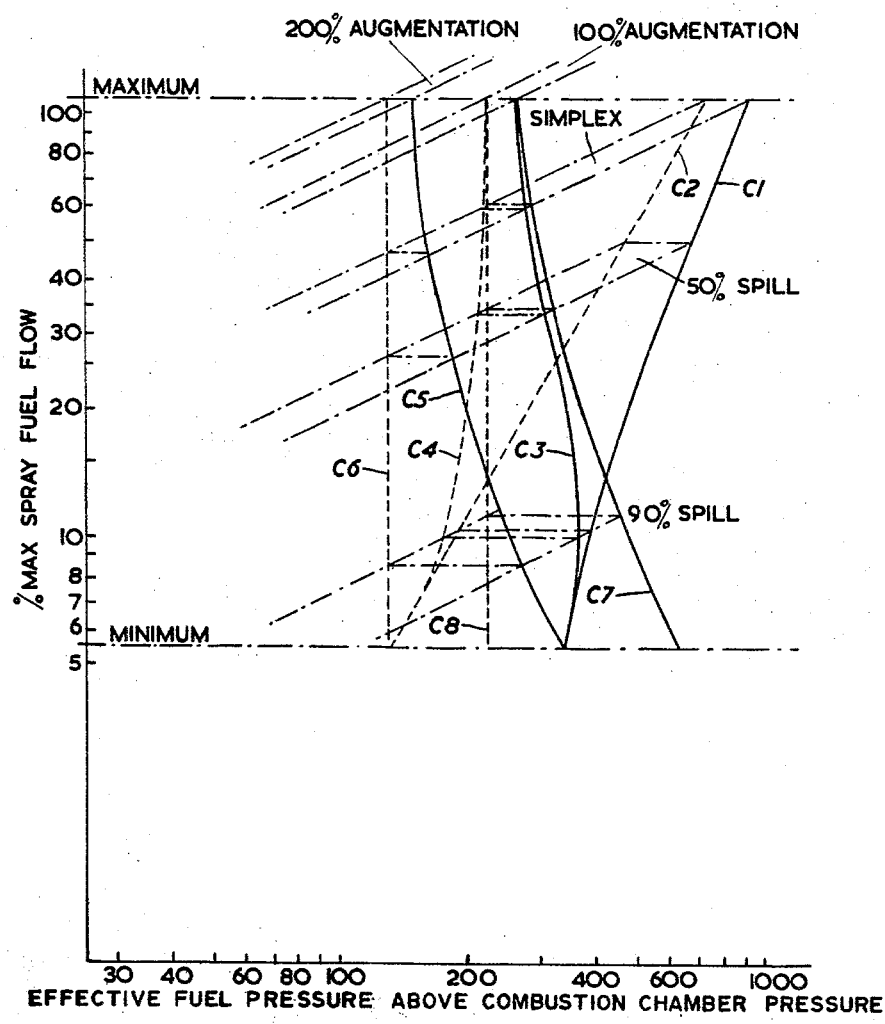
Figure 5:
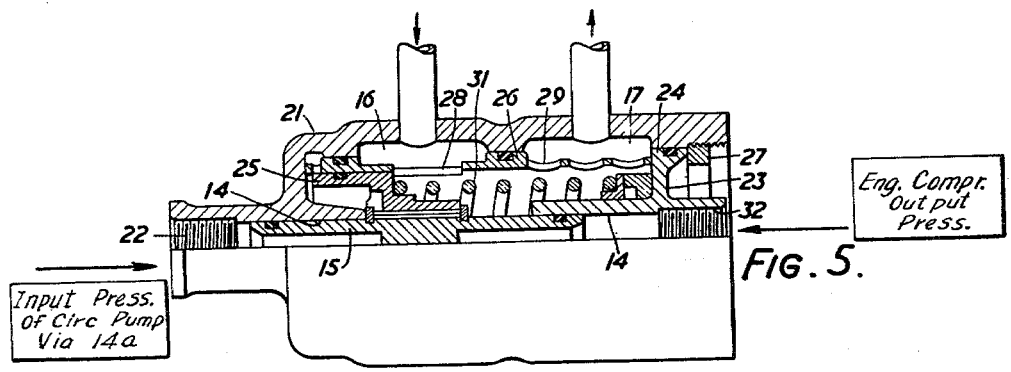
Figure 6:
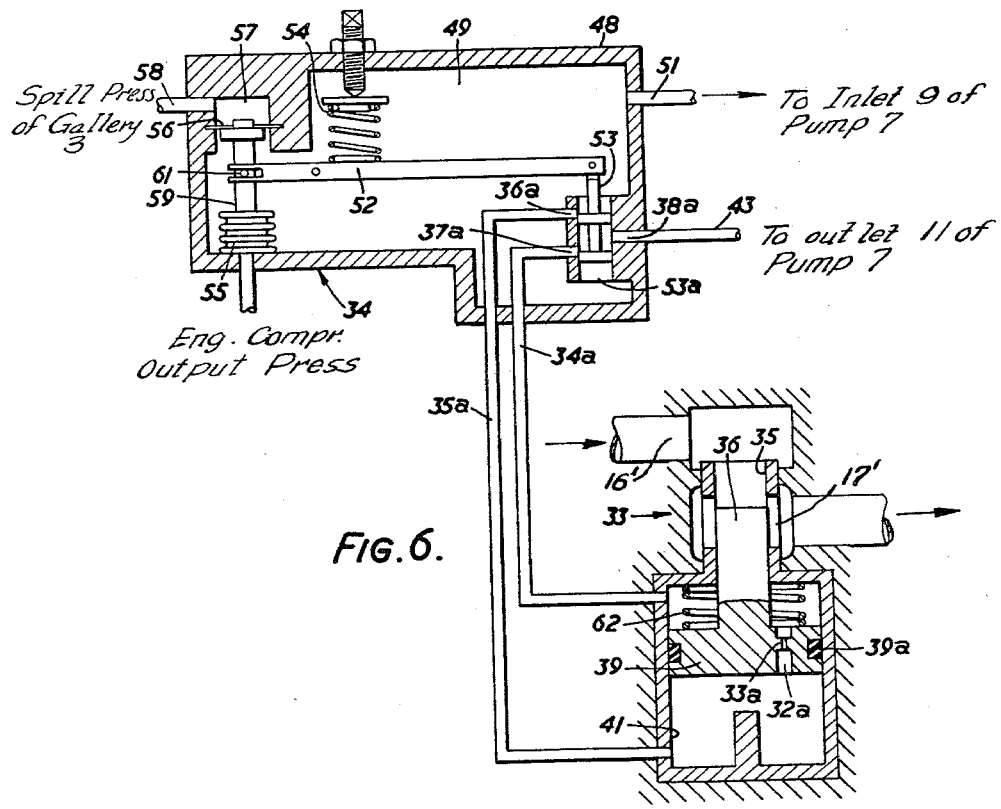

Two embodiments of the invention used in the supply of fuel to gas turbine engines will now be described with reference to the accompanying drawings, in which:

FIGURE 1 is a cross section through a typical spill spray nozzle,

FIGURE 2 is a schematic diagram of a fuel supply system employing such a nozzle, FIGURES 3 and 4 are graphs setting out characteristics of spill nozzles when used in the system of FIGURE 2, FIGURE 5 is a detailed sectional view of a practical form of the regulator of FIGURE 2, and FIGURE 6 is a detailed part sectional view of another regulator or throttle and control unit which can be substituted for the regulator of FIGURE 5 in the system of FIGURE 2.

An example of a known type of spill spray nozzle that may be used with any of the examples of the invention to be described is illustrated in FIGURE 1. This nozzle comprises a hollow body member 82 within which functional components of the burner are clamped in an axial sense. A swirl chamber 85 is located at one end of the nozzle from which a spray orifice 86 extends. Fuel under pressure is supplied into casing 82 and passes along passage 88 into tangential holes 89 which give access into the swirl chamber causing the entering fuel to swirl around the chamber. Within the rear wall of the swirl chamber 85 an annular spill take-off connection 91 is located from which fuel may pass rearwardly from the swirl chamber 85. Fuel passing from the spill take-off connection 91 passes backwardly through passages 92 into a central spill pipe 93 which extends centrally through the nozzle body. This spill spray nozzle is the subject of U.S. Patent 2,697,636.

Referring now to FIGURE 2 a single spill nozzle is indicated at 1 and this is intended to represent a plurality of such nozzles connected in parallel between an inlet gallery 2 and a spill gallery 3. Each of these nozzles may be constructed as shown in FIGURE 1. These galleries extend respectively from the outlet 4 and the inlet 5 of a centrifugal engine driven pump 6 which for convenience will be referred to as the circulating pump. The pump 6, galleries 2 and 3 and spill nozzles 1 form a circulating system, a proportion of the fuel entering the nozzle inlets through gallery 2 being discharged as spray from the nozzles whilst the remainder returns as spill flow through the spill gallery 3. Fuel is supplied to the circulating system from a variable displacement engine driven pump 7 whose displacement is adjustable by a lever 8. The pump 7 draws fuel from pipe 9 which extends from a suitable fuel reservoir. Pumped fuel from pump 7 is delivered to pipe 11 and enters the circulating system at the inlet 5 of the circulating pump 6. The lever 8 of pump 7 is preferably adjusted by automatic means sensitive to engine requirements to give a desired engine performance. Normally fuel from pipe 11 mixes with spill flow at inlet 5 of circulating pump 6 and the total flow passes through pump 6 in which the pressure is raised by an amount approximately proportional to the square of engine speed. In the spill nozzles 1 some of this fuel, equivalent to the rate of flow through pump 7, leaves the nozzles as spray whilst the remainder returns at a lower pressure through spill gallery 3 to inlet 5 of pump 6. If the output of pump 7 is increased to a sufficiently large extent the pump 6 will not accept the whole flow and a part of the output of pump 7 will then pass along the spill gallery 3 into the nozzles. The nozzles will then receive fuel both from the supply gallery 2 and the spill gallery 3 and the total leaves the nozzles as spray. This condition is referred to as augmented flow. Nozzles as disclosed in FIGURE 1 may be operated in the augmented flow condition with lower inlet and spill pressures to the nozzle than would be the case if the nozzle were to operate in the normal manner. It is desirable that at starting the nozzles should not be capable of augmented flow because the low pump pressures cannot ensure atomisation of spray. For this purpose valve 1a is provided having a non return valve member 3a arranged to prevent flow from inlet 5 to connection 3. During normal running valve member 3a is held open by rod 6a and piston 5a which latter is acted on by supply pressure from gallery 2 through pipe 2a. Spring 7a ensures that valve member 3a is not urged open by piston 5a when a low supply pressure exists in gallery 2 on starting.

It is desirable to explain the relations between spill and supply pressures for different spray flow rates and reference is now made to FIGURE 3. In this figure a graph is plotted on logarithmic co-ordinates showing the relation between spill and supply pressures and spray flow rates. The spill and supply pressures shown are the values by which the actual pressures exceeed engine combustion chamber pressure and which represent the effective supply and spill presssure conditions at the spill nozzles. For every engine speed it is possible to represent conditions by a pair of lines showing firstly spray flow plotted against nozzle supply pressure and secondly spray flow plotted against spill pressure. The fact that at any one engine speed there are considerable variations in spray flow is explained by the fact that the fuel demand of the engine reduces considerably with increased altitude, i.e. reducing ambient air pressures. Such variations would also occur with an engine fixed at ground level with variations of mechanical load. Three sets of curves A, B and C are shown representing running conditions for the nozzles at 25%, 70% and full engine speeds. Each set of curves comprises two curves indicated by the suffix 1 or 2. Suffix 1 refers to supply pressure conditions and suffix 2 refers to spill pressure conditions. Thus curve A1 shows supply pressure conditions and spray flow at 25% engine speed. There is always a constant pressure difference at any one engine speed between supply and spill pressures since the difference is the pressure rise at the circulating pump 6. The upper ends of each set of curves represents the maximum spray flow condition where there is no spill flow although there is considerable spill pressure. This condition is referred to as the simplex condition. Lines indicating common percentage spill to supply flow relationship are drawn through the curves for differing engine speeds, e.g. lines $x_1$ and $x_2$ show the 50% spill to supply flow relationship. It will be seen from this graph that the lowest pressure in the circulating system during operation is the spill pressure at 25% engine speed (curve A2) and the highest pressure is supply pressure at full engine speed (curve C1).

One important feature apparent from these curves is that at lower engine speeds particular spray flow rates of fuel are obtained at lower pressure, for example the spray flow rate in the simplex condition at 25% engine speed is obtained at about 60 p.s.i. but the same spray flow rate at maximum engine speed is obtained at about 500 p.s.i., but in this latter case there is approximately 70% spill. Clearly pumps, pressure connections and the like are necessarily made stronger and heavier to supply fuel at higher pressures and also more power is used. The realisation that higher spray flow rates may be obtained at lower pressure if the spill flow is reduced leads to the present invention in that by controlling the relation between supply flow and spill flow rates at a spill nozzle it is possible to obtain desired spray flow rates at lower pressures while at the same time maintaining the essential advantage of spill nozzles that adequate atomisation may be obtained at low discharge flow rates by having a comparatively large percentage of return spill flow.

In applying the invention to FIGURE 1 a spill pressure regulator 12 is provided which comprises a cylinder 14 within which a piston valve 15 is located having a waisted portion which acts to control fuel flow between ports 16 and 17 in the cylinder walls. These ports are connected in series with the supply fuel flow from pump outlet 4 to gallery 2. The cylinder 14 is connected at one end at 14a to the pump inlet 5 and at the other end at 14b to an engine gas pressure, such as combustion chamber pressure. Movement of the piston is opposed by a spring 18 located within the cylinder so that movement of the piston is proportional to the effective spill pressure at the nozzle, i.e. actual spill pressure less combustion chamber pressure. The throttling action at ports 16 and 17 reduces the pressure of the output flow from the circulating pump 6 thus increasing the tendency for fuel from the output 11 or pump 7 to flow into spill gallery 3 to produce the augmented flow condition in the nozzles.

The action of the regulator upon the spill system is illusrated in FIGURE 4 which is a graph similar to FIGURE 3 but showing also the regulated conditions for maximum engine speed. Curves C1 and C2 show the supply and spill pressures for varying spray flow rates without the regulator as in FIGURE 3. Curves C3 and C4 show nozzle performance at maximum engine speed with the regulator 12 in operation. At maximum spray fuel flow it will be seen that there is 100% augmentation i.e. that similar rates of fuel flow enter the nozzle through both supply and spill connections, with the result that the maximum pressure required to obtain this spray flow rate is very considerably reduced. Similarly for lower spray flow rates the pressures are considerably reduced. Curves C3 and C4 are arbitrarily chosen as most desirable for a certain type of fuel and these curves are determined by the shape given to ports 16 and 17 in the regulator. Other curves may however by chosen such for example as curves C5 and C6 or C7 and C8. For curves C5 and C6 the spill pressure as shown by C6 is maintained at a low constant value. For curves C7 and C8 the spill pressure is maintained at a higher constant value.

For convenience in the description where the ratio of spill flow to supply flow is referred to and the spill flow is away from the nozzle the ratio will be referred to as negative and increase of such negative ratio is intended to refer to alteration of this ratio towards the simplex condition in which there is zero spill flow and/or to the positive ratio condition where flow in the spill line is towards the nozzle to augment flow in the supply line. By way of example if reference is made to curves C5 and C6 of FIGURE 4 it will be seen that at 8% maximum flow there is actually a negative ratio of spill to supply flow of 90% while at maximum flow there is a positive ratio of 200%. During increase of spray flow from 8% maximum flow to maximum flow it will be seen that supply pressure necessary has actually dropped from 260 p.s.i. to 150 p.s.i.

Reference is now made to FIGURE 5 in which is shown a practical version of the regulator 12 shown diagrammatically in FIGURE 2. Wherever possible similar reference numerals will be used. The regulator is mounted within a casing 21 having at one end a screw threaded connection 22 for connection by way of 14a to the inlet 5 of the circulating pump. The connection 22 extends into the casing to the bore 14 which is formed as a part of the casing. At the opposite end of the casing the bore 14 is continued by means of an inserted member 23 having a flange 24 locked within the casing 21 in a manner to be described. By this construction it is possible to form the bore in two parts leaving a gap centrally of the casing. The piston 15 is of elongated form to fit within both parts of the bore 14 for its range of movement. The portion of the piston 15 located in the gap in the two parts of the bore 14 has secured thereto an obturating member 25. The external surface of the member 25 is cylindrical for sliding within the bore of a cylindrical sleeve 26 located within the case 21 and the member 25 is mounted upon the piston 15 to move axially with the latter. The sleeve 26 bottoms at one end against the case 21, so that this sleeve 26 and the member 23 are locked in position by means of a lock-nut 27 in a screw threaded recess in the end of the casing 21. The ports 16 and 17 carrying the supply flow from the circulating pump outlet 4 to the supply gallery are formed within the wall of the casing and suitable pipe means extend to them within the wall of the casing. The ports are also arranged to correspond with a pair of openings 28 and 29 in sleeve 26, the first of which corresponds with port 16 and the latter of which corresponds with port 17. Within the sleeve 26 a compression spring 31 is located which acts between the flange 24 at one end and the obturating member 25 at the other end to urge the latter to the position where it entirely uncovers the opening 28. The inserted member 23 has at its outer end a screw threaded connection 32 for connecting by way of 14b to an engine gas pressure, in this case engine compressor output pressure.

In operation it will be seen that the piston 15 and with it the obturator 25 moves against the load of spring 31 in response to the pressure difference between the spill pressure in gallery 3 and compressor output pressure. In so doing the opening 28 becomes partially closed and forms the variable restriction in the flow to the supply gallery of the spill nozzles. The shape of the opening 28 is determined by the particular relation to be provided between spill pressure and supply pressure at the nozzles.

In the regulator described in FIGURE 5 it is necessary for a number of seals to be provided which prevent pressurized fuel passing through ports 16 and 17 from having access to the connections 22 and 32. In some circumstances seals are undesirable and at FIGURE 6 an alternative version is shown which substantially avoids seals.

The regulator as shown in FIGURE 6 is formed in two units of which the unit actually connected in the inlet gallery 2 of the circulating system of FIGURE 2 is a throttle unit 33 whilst a control unit 34 is remotely located and connected to opposite sides of the pump 7. The throttle unit comprises a cylinder 35 within which a piston valve 36 is located to control flow between port 16' at the end of cylinder 35 to port 17' in the cylinder wall. The piston valve 36 is slidable by means of a servo piston 39 mounted within a servo cylinder 41. The upper side of the servo piston is connected to the piston valve 36. The cylinder 41 is connected at its upper and lower ends by pipes 34a and 35a to slide valve 53a in control unit 34. A restrictor 33a extends through servo piston 39 for a purpose to be described. The control unit comprises a casing 48 enclosing a chamber 49 connected by pipe 51 to the inlet 9 of pump 7. Within chamber 49 a lever 52 is pivotally mounted this lever being operatively connected to slide valve 53a which co-operates with the pipes 34a and 35a which open on to the slide valve at spaced ports 37a and 36a. The slide valve is fed with pressure fuel by pipe 43 from the output 11 of pump 7, and the function of the slide valve in its lower position is to connect pressure to pipe 34a and drain pressure to pipe 35a whereby to cause servo piston 39 to move downwardly. Upward movement of slide valve 53a will accordingly cause upward movement of servo piston 39. Restrictor 33a allows flow of fuel through the servo piston and cylinder to keep it cool because of the high temperature to which fuel may rise in the circulating system. The lever 52 is acted upon by a compression spring 54 acting in a sense to lower the slide valve 53a. A bellows 55 in connection with compressor output pressure and a rubber pressure pad 56 located in a cylindrical portion 57 of the chamber 49 and responsive to spill pressure from the gallery 3 fed through pipe 58, are interconnected by a rod 59 having a cross-pin 61 acting on lever 52. The rod 59 exerts a moment on lever 52 opposite to that exerted by spring 54 and the degree of opening given to the slide valve 53a will thus depend on the amount by which spring 54 is compressed by the resultant force acting through rod 59. The movement given to slide valve 53a will determine flow of pressure liquid from pipe 43 and the direction of movement of the piston 39 within the cylinder 41. As spill pressure alters following the adjustment of the flow through ports 16' and 17', the force developed on pad 56 will alter until the lever 52 moves back to the control position of slide valve 53a at an equilibrium position for piston 39.

In operation in the condition where spill pressure is low the piston 39 will be at a lower position such that port 17' is almost fully open. At higher spill pressures the lever 52 will move against the loading of spring 54 to tend to raise the slide valve 53a thus raising the piston 39. This in turn would cause the piston valve 36 to rise and to throttle a flow of fuel from port 16' to port 17'.

I claim as my invention:

1. In combination, a spill spray nozzle; means defining a liquid circulating system for the nozzle including a circulating pump having an inlet and outlet, a supply connection between the pump outlet and the nozzle to deliver the pump output to the nozzle, and a spill connection between the nozzle and the pump inlet to return any spill flow to the pump; a source of liquid for the system; liquid feed means interconnecting the liquid source with the spill connection to add liquid to the system at the pump inlet by way of the spill connection; and liquid flow control means which are operable under the condition in which rate of liquid addition to the system exceeds the pump output, to reduce such output to adjust the distribution of augmented flow in the supply and spill connections.

2. The combination according to claim 1 wherein the liquid flow control means include a pump delivery control for reducing the delivery of the pump and means which are responsive to an increase in pressure in the spill connection above a predetermined level to actuate the pump delivery control.

3. The combination according to claim 1 wherein the liquid flow control means are responsive to the condition in which the rate of liquid addition to the system has increased to a rate approaching the pump output, to reduce such output to initiate the augmented flow condition in the supply and spill connections.

4. In combination, a spill spray nozzle; means defining a liquid circulating system for the nozzle including a circulating pump having an inlet and outlet, a supply connection between the pump outlet and the nozzle to deliver the pump output to the nozzle, and a spill connection between the nozzle and the pump inlet to return any spill flow to the pump; a source of liquid for the system; liquid feed means interconnecting the liquid source with the spill connection to add liquid to the system at the pump inlet by way of the spill connection; liquid flow control means operable to restrict the delivery from the pump, and means responsive to the approach of the flow rate of the liquid feed means to an upper level in its range to cause the flow control means to restrict delivery from the pump to cause the circulating system to operate in an augmented condition.

References Cited by the Examiner

UNITED STATES PATENTS

| | | | |
|---|---|---|---|
| 2,290,250 | 7/42 | Olches | 158—36.4 |
| 2,313,298 | 3/43 | Martin et al. | 158—73 X |
| 2,578,934 | 12/51 | Janssen | 158—73 X |
| 2,697,636 | 12/54 | Hahn | 239—125 |
| 2,702,591 | 2/55 | Dickey | 158—73 |
| 2,724,239 | 11/55 | Fox | 60—39.28 |
| 2,757,961 | 8/56 | Nims | 158—73 X |
| 2,758,638 | 8/56 | Lawrence | 158—36 |
| 3,078,046 | 2/63 | Tyler | 239—126 |

JAMES W. WESTHAVER, Primary Examiner.

FREDERICK L. MATTESON, Jr., Examiner.